United States Patent [19]

Nakamura

[11] Patent Number: 4,505,112
[45] Date of Patent: Mar. 19, 1985

[54] MASTER CYLINDER

[75] Inventor: Kaoru Nakamura, Anjo, Japan

[73] Assignee: Aisin Seiki Kabushiki Kaisha, Kariya, Japan

[21] Appl. No.: 554,677

[22] Filed: Nov. 23, 1983

[30] Foreign Application Priority Data

Nov. 30, 1982 [JP] Japan ................................ 57-210170

[51] Int. Cl.³ .............................................. F15B 7/10
[52] U.S. Cl. ...................................... 60/533; 60/585; 92/161
[58] Field of Search ................... 60/533, 585; 92/161, 92/169; 285/189, 205; 248/674

[56]  References Cited
U.S. PATENT DOCUMENTS 3,005,669 10/1961 Nunnemacher ...................... 92/161
3,785,252  1/1974 Cornair ................................ 92/161
4,289,162  9/1981 Nomura ............................... 60/586

Primary Examiner—Robert E. Garrett
Assistant Examiner—Scott L. Moritz
Attorney, Agent, or Firm—Oblon, Fisher, Spivak, McClelland & Maier

[57]  ABSTRACT

A master cylinder of resin material includes a cylinder having a receiving portion within which a piston is sealingly slidable, a cylindrical portion having a diameter which is larger than that of an outer periphery of the cylinder and coaxially rearwardly extending from the fore part of the receiving portion, and mounting flanges radially extending from a rearward end of the cylindrical portion. Each of the cylinder, the cylindrical portion and the mounting flanges are integrally formed.

6 Claims, 3 Drawing Figures

FIG. 3 *PRIOR ART*
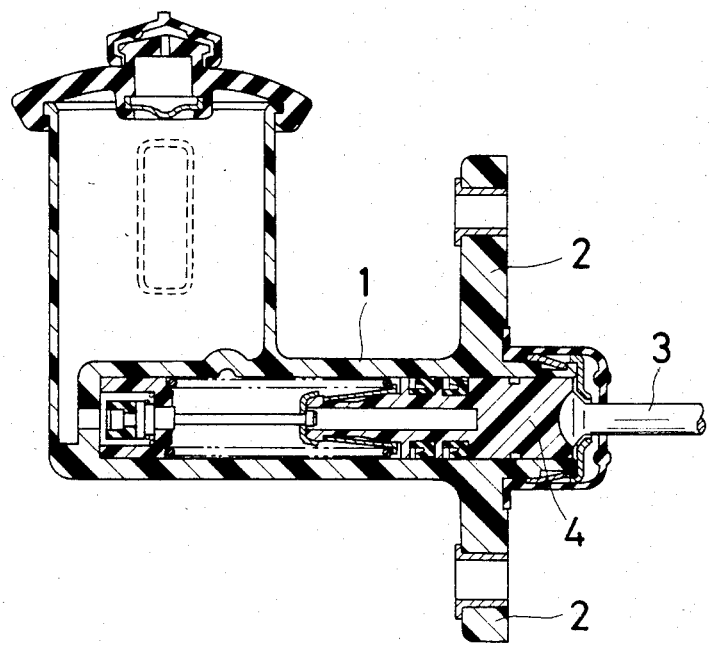

# MASTER CYLINDER

BACKGROUND OF THE INVENTION

1. Field of the Invention

The present invention relates to a master cylinder for a hydraulic brake or clutch release system of an automotive vehicle, and, more particularly, to a master cylinder including a cylinder body made of resin material which is molded and a piston which is slidably received within an inner cylinder surface of the cylinder body.

2. Description of the Prior Art

In the technical field relating to a brake master cylinder or the like for an automotive vehicle, a cylinder body has often been formed from a mold resin material in recent years to reduce the weight thereof.

Such master cylinder which is shown in FIG. 3 has a cylinder body 1 of resin material having at a rearward outer surface thereof two outward extending flanges 2 which are secured to a dash board of a vehicle body. A piston 4 which is slidably received within the cylinder body 1 is movable to the left by a push rod 3 in response to a depressing force on a brake or clutch release pedal. Therefore, the load in the left direction is applied on the cylinder 1 when the pedal is depressed and thus the outward extending flanges 2 may be deflected. This results in an increase of an idle stroke of the pedal.

In such master cylinder, the portions of the flanges 2 which are combined with the cylinder 1 are extremely thick in comparison with other portions of the cylinder 1. Therefore, the above combined portions will be contracted when molded and it is difficult to secure a true rounding of the inner surface of the cylinder 1. As a result, the inner surface of the cylinder 1 which corresponds to the above combined portions may not be applicable as a receiving portion within which the piston 4 is sealingly slidable. In order to secure the receiving portion by the desired length, the cylinder 1 has to be lengthened. It is noted that the inner surface of the cylinder 1 within which the piston 4 is directly received may not be processed to reduce the cost.

SUMMARY OF THE INVENTION

It is, therefore, an object of the present invention to provide a new and improved master cylinder which obviates the above mentioned prior drawbacks.

It is another object of the present invention to provide a new and improved master cylinder which reduces an idle stroke of a pedal.

It is still another object of the present invention to provide a new and improved master cylinder which reduces the length of a cylinder.

According to the present invention, there is provided a master cylinder including a cylinder of resin material having a receiving portion within which a piston is sealingly slidable in response to a depressing force on a pedal, a cylindrical portion having a diameter which is larger than that of an outer periphery of the cylinder and coaxially rearwardly extending from the fore part of the receiving portion of the cylinder in one body, and mounting flange means radially extending from a rearward end of the cylindrical portion in one body.

BRIEF DESCRIPTION OF THE DRAWINGS

Various other objects, features and attendant advantages of the present invention will be more fully appreciated as the same becomes better understood from the following detailed description when considered in connection with the accompanying drawings wherein:

FIG. 3 is a view similar to FIG. 1, but showing a prior master cylinder.

DETAILED DESCRIPTION OF THE PREFERRED EMBODIMENT

Figure 1:
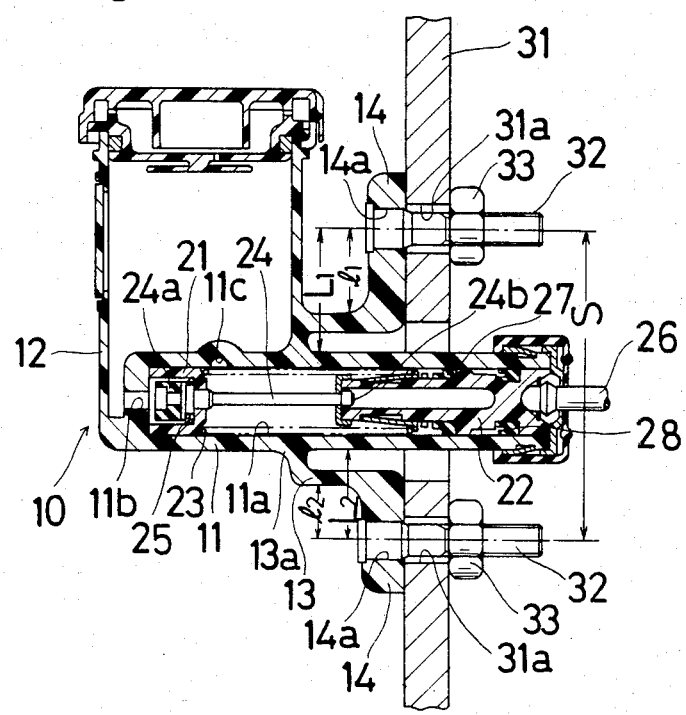
FIG. 1 is a cross sectional view of a master cylinder according to the present invention.

Referring now to FIG. 1 showing a master cylinder 10 according to the present invention, a cylinder 11, a reservoir 12, a cylindrical portion 13 and two mounting flanges 14 are integrally molded. These parts are made from FRP material which is, in turn, made from a suitable resin material mixed with a staple glass fiber.

The reservoir 12 is formed at the outer periphery of the cylinder 11 between the left fore part of the cylinder 11 and the middle of the cylinder 11 and is in communication with an inside bore 11a of the cylinder 11. A valve case 21 of resin material is slidably received within the cylinder 11 and a piston 22 of resin material is slidably sealingly received within the cylinder 11 through means of primary and secondary seal members 27 and 28. A compressed spring 23 is inserted between the valve case 21 and the piston 22 whereby the piston 22 is biased in its illustrated rearward position and the valve case 21 is biased in its illustrated forward position. The valve case 21 and the piston 22 are operatively connected by means of a connecting rod 24 which has at the fore part thereof a valve portion 24a. The valve portion 24a extends to the interior of the valve case 21 so as to face a passage 11b which completes the fluid communication between the reservoir 12 and the inside bore 11a of the cylinder 11. Inserted between the valve case 21 and the valve portion 24a is a spring 25 which biases the connecting rod 24 to the left so that a rearward end 24b of the connecting rod 24 is brought in engagement with the piston 22. When a push rod 26 is moved to the left in response to the depressing force on the brake or clutch pedal, the piston 22 is caused to be moved to the left against the biasing force of the spring 23. When the piston 22 is slightly moved to the left, the valve portion 24a is brought in contact with the bottom of the aft or fore part of the inside bore 11a by means of the spring 25 to thereby close the passage 11b. The hydraulic pressure within the inside bore 11a is now increased and is applied to a hydraulic pressure operated means such as brake wheel cylinder through means of a port 11c.

The cylindrical portion 13, the diameter of which is larger than that of the outer periphery of the cylinder 11, is integrally formed with the reservoir 12 and the cylinder 11 at the approximate middle portion of the outer periphery of the cylinder 11 and coaxially rearwardly extends radially outwardly of the cylinder 11 by a predetermined length. A connecting portion 13a of the cylindrical portion 13 which is connected with the outer periphery of the cylinder 11 is located forward of the forwardmost point of contact of the piston 22, and the cylinder (i.e. the forwardmost point of contact of seal 27 with cylinder 11). Two mounting flanges 14 radially extend from the rearward end of the cylindrical portion 13 for a predetermined length, respectively. The above master cylinder 10 is mounted on a dashboard 31 of the vehicle by means of bolts 32 and nuts 33 with a mounting dimension S, the bolts 32 passing through mounting holes 14a and 31a formed in the flanges 14 and the dashboard 31, respectively.

Figure 2:
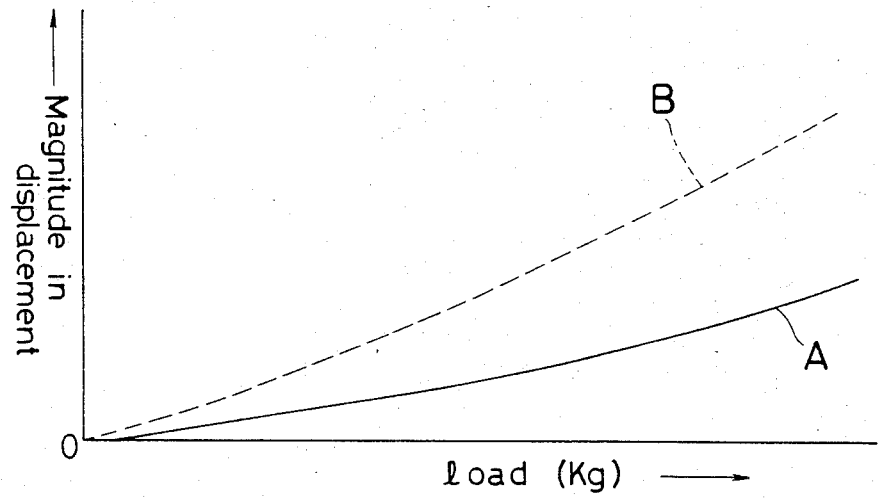
FIG. 2 is a graph showing the relation between a load applied on a cylinder and a magnitude in a displacement of the cylinder to the fore part thereof.

In the above master cylinder, preset distances L1 and L2 should be maintained between the outer periphery of the cylinder 11 and the mounting holes 14a of the mounting flanges 14 from the standpoint of mounting the master cylinder on the dashboard 31 and the like. In order to secure the above distances L1 and L2, the lengths of the flanges 14 to the mounting holes 14a thereof may be set as distances l1 and l2, respectively, since the mounting flanges 14 are formed on the rearward end of the cylindrical portion 13. Therefore, the radially extending lengths of the flanges 14 according to the present invention may be reduced by the lengths (L1−l1) and (L2−l2), respectively, in comparison with the prior art master cylinder in FIG. 3. As a result, even when the load in the leftward direction is applied on the cylinder 11 upon depressing on the brake or clutch pedal, the deflection of the flanges 14 in the same leftward direction will be reduced so that an increase of the idle stroke of the brake or clutch pedal will be restricted. In FIG. 2 showing the relation between the load applied on the cylinder 11 and the magnitude in the displacement of the cylinder 11 to the left or fore part thereof, the solid line (A) denotes a characteristic of the present invention while the dotted line (B) denotes a characteristic of the prior art master cylinder in FIG. 3. As will be clear from FIG. 2, the deflections of the flanges 14 to the left and an increase of the idle stroke of the pedal are greatly restrained.

Since the connecting portion 13a of the cylindrical portion 13 is defined as being located adjacent a forward end portion of the receiving portion of the cylinder 11 within which the piston 22 is sealingly slidable, a true rounding of the rearward part of the inside bore 11a of the cylinder 11 will be possible so that the right or rearward part of the inside bore 11a will be effectively utilized as receiving portion. This serves to shorten the length of the cylinder 11.

The above cylindrical portion 13 may be modified so as to have a hollow conical shape and the cylindrical portion 13 may be combined with the cylinder 11 at a forward portion of the cylinder 11. In addition to, in the master cylinder formed from FRP material, the staple fiber will be exposed on the inner surface of the cylinder 11 when the inside bore of the cylinder 11 is processed in order to allow for a true rounding of the inside bore and thus the sealing cups on the piston will be prematurely damaged. Such disadvantage will be obviated by the master cylinder according to the present invention.

Obviously, many modifications and variations of the present invention are possible in light of the above teachings. It is therefore understood that within the scope of the appended claims the invention may be practiced otherwise than as specifically described herein.

What is claimed is:

1. A master cylinder of resin material adapted to be connected to a dashboard and operatively associated with a pedal, comprising:
   a cylinder;
   a piston sealingly slidable in response to a depressing force on said pedal;
   a cylindrical portion having an inner diameter which is larger than that of an outer periphery of said cylinder and coaxially rearwardly extending radially outwardly of said cylinder and a connecting portion connected with said outer periphery of said cylinder forward of the forwardmost point of contact between the piston and the cylinder; and
   mounting flange means connected to said dashboard and unitarily radially extending from the rearward end of said cylindrical portion for reducing deflection of said flange means upon movement of said pedal and restricting any increase in idle stroke of said pedal.

2. A master cylinder as set forth in claim 1 wherein said mounting flange means has two flanges.

3. A master cylinder as set forth in claim 1 wherein said cylindrical portion further comprises a hollow conically shaped cylindrical portion.

4. A master cylinder as set forth in claim 1 wherein said pedal further comprises a brake pedal.

5. A master cylinder as set forth in claim 1 wherein said pedal further comprises a clutch pedal.

6. A master cylinder as set forth in claim 1, wherein said cylindrical portion is unitarily formed with said cylinder.

* * * * *